United States Patent [19]

Freeman et al.

[11] Patent Number: 5,658,006
[45] Date of Patent: Aug. 19, 1997

[54] SPRING POCKET SUSPENSION MOUNTING ASSEMBLY

[75] Inventors: Richard B. Freeman, Oxford; Mark C. Handley, Beverly Hills; Donald L. Flagg, Oxford, all of Mich.

[73] Assignee: The Budd Company, Troy, Mich.

[21] Appl. No.: 580,151

[22] Filed: Dec. 28, 1995

[51] Int. Cl.⁶ .................................................. B60G 11/16
[52] U.S. Cl. .................... 280/688; 280/724; 267/179; 267/286
[58] Field of Search ............................... 280/724, 725, 280/726, 688, 788, 673, 715, 697, 701; 267/179, 178, 170, 286, 33, 248

[56] References Cited

U.S. PATENT DOCUMENTS

| | | | |
|---|---|---|---|
| 1,546,164 | 7/1925 | Bluhm | 267/286 |
| 1,777,565 | 10/1930 | Hulley | 267/248 |
| 2,260,634 | 10/1941 | Mullner | 280/724 |
| 2,741,476 | 4/1956 | Burney | 267/166.1 |
| 2,989,133 | 6/1961 | Hodkin | 280/725 |
| 3,901,494 | 8/1975 | Sena | 280/724 |
| 4,341,397 | 7/1982 | Morimura et al. | 280/688 |
| 5,102,164 | 4/1992 | Fujinaka et al. | 280/788 |
| 5,112,078 | 5/1992 | Galazin et al. | 280/688 |
| 5,382,044 | 1/1995 | Smith et al. | 280/673 |

FOREIGN PATENT DOCUMENTS

| | | | |
|---|---|---|---|
| 870155 | 3/1942 | France | 280/688 |
| 1278106 | 10/1961 | France | 267/248 |

*Primary Examiner*—Brian L. Johnson
*Assistant Examiner*—Peter C. English
*Attorney, Agent, or Firm*—Harness, Dickey & Pierce, P.L.C.

[57] ABSTRACT

A one-piece cast suspension mounting spring pocket having a circular, radially contoured disk portion and having a plurality of flanges is disclosed. The disk portion serves as a spring pocket and prevents a spring from radial movement. The flanges are parallel to and spaced from one another, and are generally perpendicular to the disk portion of the one-piece cast member. One or more of the flanges intersects a frusto-conical formation which is radially centered in the disk portion, the intersecting flange conforming to and bowing with the frusto-conical formation. The structural integrity of the one-piece cast spring pocket is improved when compared to the currently produced multi-piece spring pockets by having the flange intersect the frusto-conical section.

16 Claims, 3 Drawing Sheets

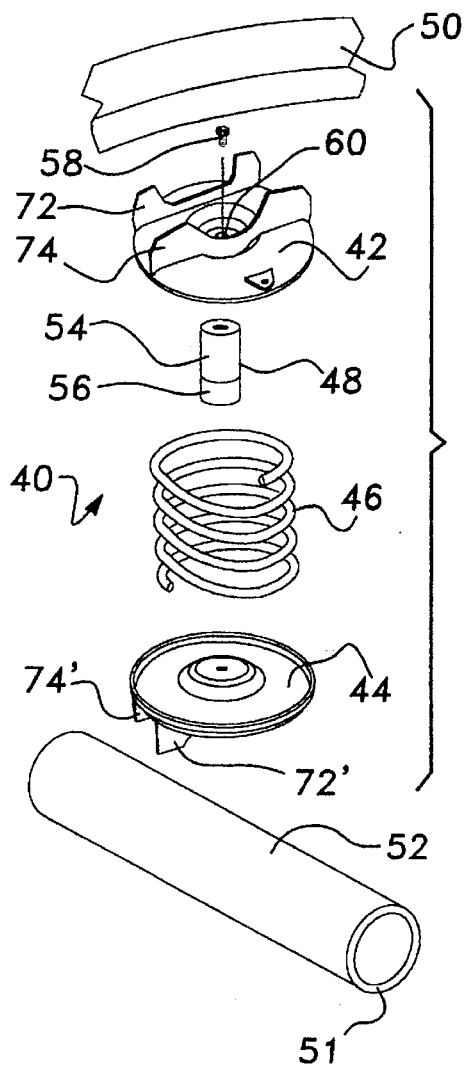
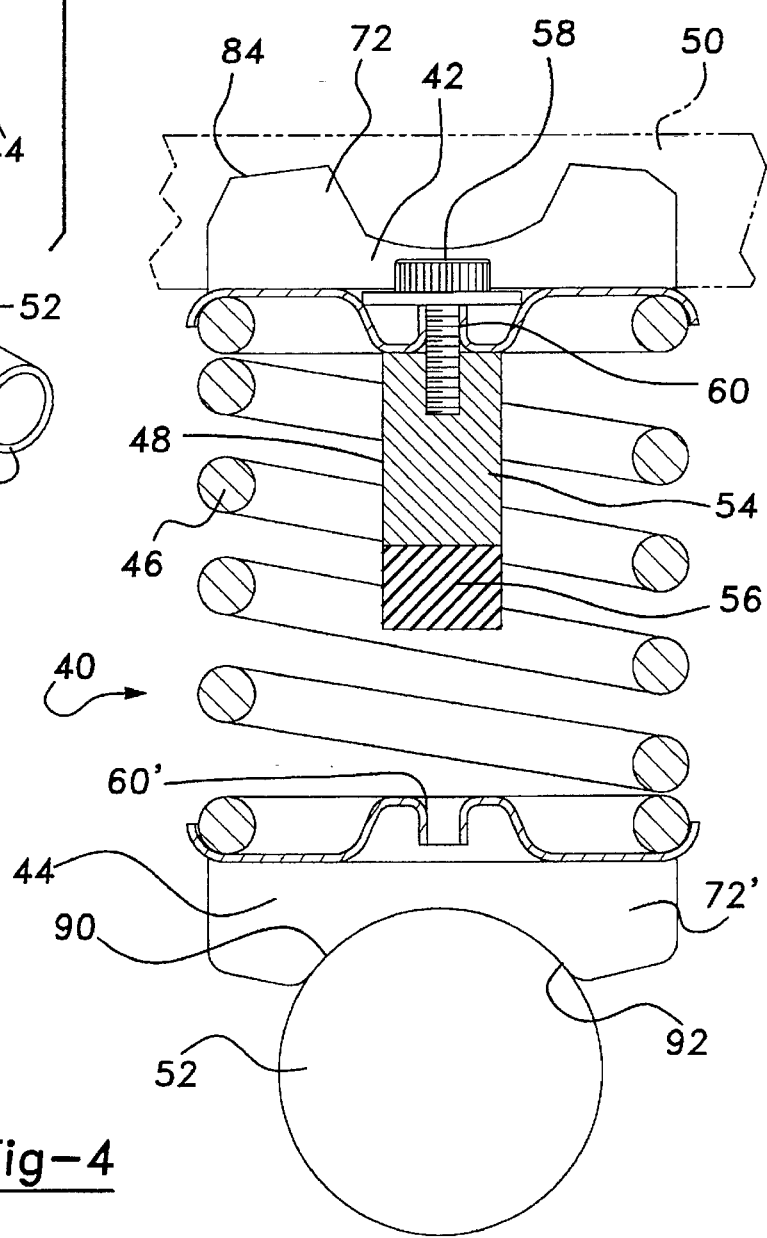

SPRING POCKET SUSPENSION MOUNTING ASSEMBLY

TECHNICAL FIELD

The present invention relates to vehicle suspension mounting assemblies and, more particularly, to a suspension spring pocket mounting constructed from a one-piece cast unit.

BACKGROUND OF THE INVENTION

Vehicle suspension spring pockets have conventionally been made from sheet steel and are generally comprised of multiple pieces stamped and formed from the sheet steel and subsequently welded or fastened together by other acceptable means. While this method of constructing spring pockets has generally performed satisfactorily, the systems have the inherent drawback of having increased weight due to the overlapping of materials and, as with any multi-piece construction, some degree of unwanted variation occurs during the assembly process. Further, the multi-piece configuration inherently has additional costs associated with its production. Each component of the assembly must be individually stamped, positioned with respect to one another in a holding fixture, and subsequently fastened together. Each operation required to produce the final assembled spring pocket requires additional handling and therefore an increase in labor costs. There are also additional costs associated with producing and maintaining the several dies required to stamp the multiple pieces, the holding fixture used in fastening the pieces, and the welding or other fastening equipment which may be used in the assembly process to produce the final assembled spring pocket.

SUMMARY OF THE INVENTION

The improved suspension mounting spring pocket of the present invention employs a one-piece east member having a generally circular, radially contoured disk portion serving as a spring pocket, and a plurality of flanges which are parallel to and spaced from one another, and are generally perpendicular to the disk portion of the one-piece cast member. The one-piece cast construction of the present invention reduces both cost and weight over the prior art multi-piece spring pockets, and provides greater flexibility in efforts to optimize the strength of the spring pocket at a given weight constraint.

In the preferred embodiment, the east steel spring pocket is comprised of a disk portion which is contoured such that a first side engages one or more suspension springs used to support the vehicle frame on an axle assembly, and a second side having flange formations which function to increase the structural integrity of the disk portion, as well as, providing a means for attaching the spring pocket to a frame member or an axle assembly. By utilizing a one-piece east member, as opposed to a multi-piece stamped and welded assembly, the spring pocket may be designed to provide equivalent or better strength while concurrently reducing cost and weight.

BRIEF DESCRIPTION OF THE DRAWINGS

The various advantages of the present invention will become apparent to one skilled in the art upon reading the following specification and by reference to the drawings in which:

FIG. 3 is an exploded perspective view of the preferred embodiment of the present invention;

FIG. 4 is a side assembly view of the preferred embodiment of the present invention;

DESCRIPTION OF THE PREFERRED EMBODIMENT

Figure 1:
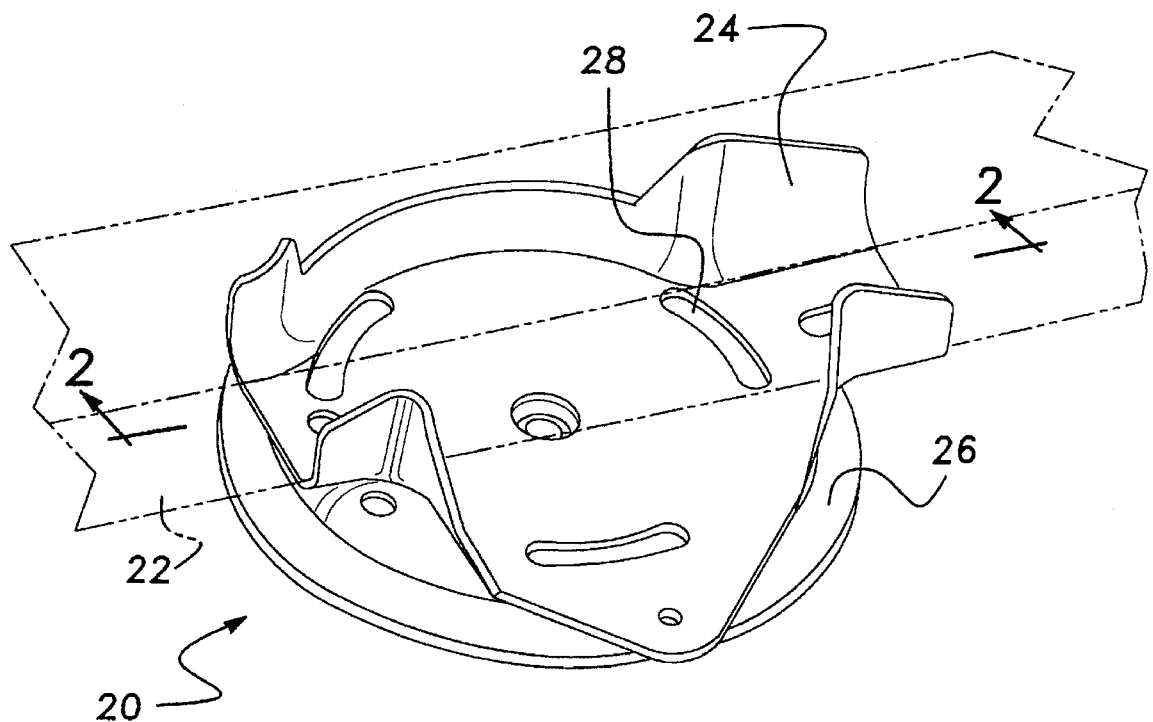
FIG. 1 is a perspective view of a typical, currently produced prior art spring pocket shown attached to a frame side rail.
Figure 2:
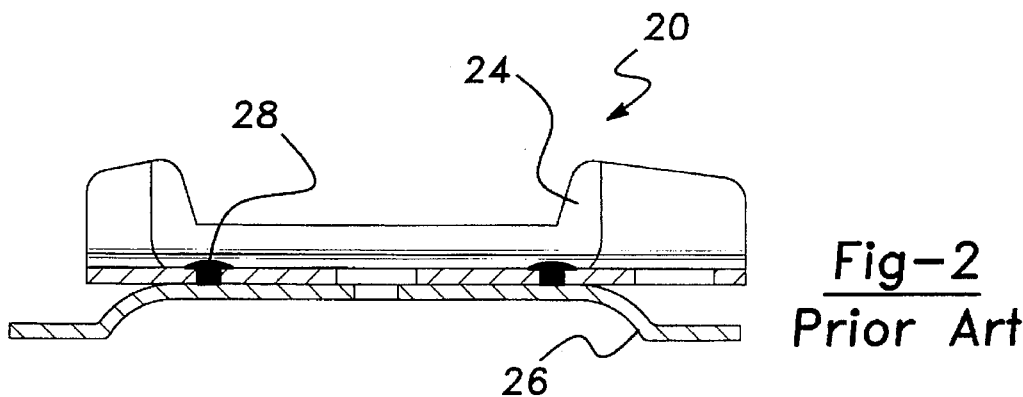
FIG. 2 is a sectional view of a prior art spring pocket taken along line 2—2 in FIG. 1.

With reference now to the drawings, particularly FIGS. 1 and 2, there is shown a prior art spring pocket assembly 20 attached to a frame side rail 22. The spring pocket 20 is comprised of an attachment portion 24 and a spring seat portion 26 which are fastened to one another by welding 28 or by other acceptable fastening means, such as riveting. In order to manufacture spring pocket 20, portion 24 and portion 26 are individually manufactured prior to being fastened to one another to form the final assembly. During the manufacture of portion 24 and portion 26, each piece is cut from a sheet of steel and then formed in a die press operation. Depending upon the depth of draw and formations required to be incorporated in either portion 24 or portion 26 a progressive set of dies may be required to form the part without stretching or tearing the material and thereby weakening the part.

Once portions 24 and 26 have been individually manufactured, the two components are positioned relative to one another in a holding fixture and are generally connected by welds 28. As with any multiple piece assembly, some variation can be expected in the final product because of a stack up of tolerances, both in the manufacture of the individual components and during the holding and fastening operation of the assembly process. By comparison to the above-described prior art multiple piece spring pocket, FIGS. 3 and 4 show a one-piece cast steel spring pocket made in accordance with the teachings of the present invention. As shown, the suspension mounting structure 40 includes a one-piece east steel upper spring pocket 42, a one-piece cast steel lower spring pocket 44, a primary spring 46, and a secondary spring 48. The primary spring 46 is positioned between the upper spring pocket 42 and the lower spring pocket 44 such that it tends to force upper and lower spring pockets 42 and 44, respectively, away from one another. Upper spring pocket 42 is secured to a frame side rail 50 upon which a vehicle body (not shown) is mounted. Lower spring pocket 44 is fastened to an axle housing 51 of axle assembly 52 which is supported at a fixed height above the ground. In such a configuration, the weight of the vehicle body is supported upon the primary spring 46 which deflects as varying load conditions and road surfaces are encountered, thereby providing a smoother and more controlled ride. Further, a secondary spring 48 is provided such that when primary spring 46 nears its limit of compression a significantly stiffer secondary spring 48 will contact the lower spring pocket 44 and prevent the primary spring 46 from "bottoming out". Secondary spring 48 is typically constructed of a threaded steel formation 54 connected to a high durometer rubber portion 56 and is fastened to upper spring pocket 42 by a threaded fastener 58 which passes through aperture 60 in upper spring pocket 42.

Figure 5:
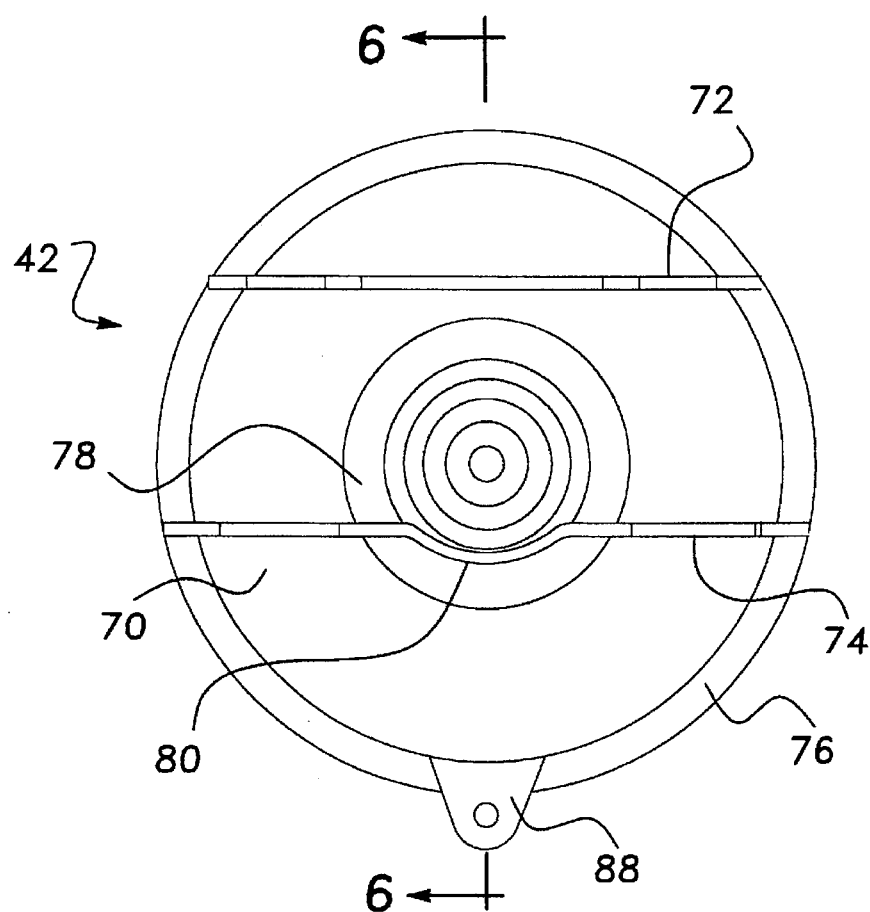
FIG. 5 is a plan view of an upper spring pocket made in accordance with the teachings of the present invention.
Figure 6:
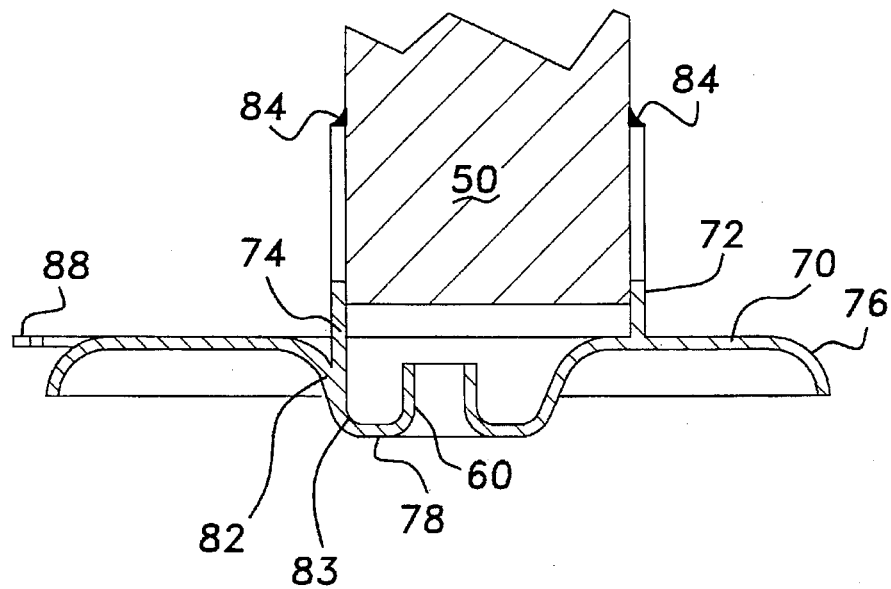
FIG. 6 is a sectional view taken along line 6—6 in FIG. 5.

FIGS. 5 and 6 show a more detailed view of the one-piece cast steel upper spring pocket 42 which is generally comprised of a contoured disk portion 70, a first flange 72 extending from disk portion 70, and a second flange 74 extending from disk portion 70. With particular reference to FIG. 6, disk portion 70 is shown to have a downturned lip 76 at its radially outer edge and a frusto-conical section 78 at a radially centered location, the frusto-conical section 78 projecting downward and having a cylindrical aperture 60 projecting upward at its radial center. Lip 76 is contoured to generally conform to the cross-sectional shape of spring 46 and act to prevent spring 46 from movement in a radial direction.

First flange 72 is generally perpendicular to disk portion 70 and traverses across disk portion 70 such that first flange 72 intersects the outer diameter of disk 70 in two locations. First flange 72 is generally linear in its path from the first intersection point to the second intersection point, and conforms to the shape of frame side rail 50. A second flange 74 also traverses across disk 70, extending from one point on the outer diameter of disk 70 to another point on the outer diameter of disk 70, and is generally perpendicular to disk 70 and generally conforms to the shape of frame side rail 50. However, second flange 74 is not linear near its central segment 80 as it traverses across disk 70. Central segment 80 of flange 74 intersects frusto-conical section 78 and conforms to and bows with section 78 causing segment 80 to intersect on a downward sloping wall 82 of section 78. The manner in which central section 80 intersects with section 78 and follows the contour of section 78, increases the structural integrity of spring pocket 42 in general, and provides improved resistance to side-to-side flexing between flange 74 and disk portion 70 since the root 83 of second flange 74 is not a continuous line which would allow for hinge like movement.

First flange 72 and second flange 74 are parallel to one another and are spaced such that frame rail 50 may be placed between flanges 72 and 74 with minimal clearance provided. Flanges 72 and 74 are welded to frame rail 50 along weld areas 84 generally located along the top portion of flanges 72 and 74 (also shown in FIG. 4). The minimal clearance allowed between frame rail 50 and flanges 72 and 74 acts in conjunction with the welding of flanges 72 and 74 to frame rail 50 to provide a strong, rigid attachment such that disk portion 70 does not experience significant flex when spring 46 exerts a force upon it.

With further reference to FIGS. 5 and 6, an attachment formation 88 is shown to be incorporated in the one-piece cast structure of upper spring pocket 42. One or more attachment formations, such as formation 88, may be incorporated in the casting to allow for the routing and attachment of wires or hoses which pass through the suspension area of the vehicle. In particular, wires for antilock braking systems and hoses for hydraulic brake systems are often routed through this area and must be securely attached so as not to be pinched in primary spring 46 as it flexes.

Again, referencing FIG. 4, a lower spring pocket 44 is shown to be attached to axle assembly 52. Lower spring pocket 44 incorporates the structural elements of upper spring pocket 42 with the exception of fastening surface 90 on first flange 72' and second flange 74' being contoured to match a corresponding fastening surface 92 on axle assembly 52. Fastening surface 90 is welded to axle assembly 52 along corresponding fastening surface 92. Axle assembly 52 is shown to be generally circular, however a wide variety of shapes and configurations are known to be used for such axle assemblies and fastening surface 90 of flanges 72' and 74' can be configured to coordinate with a wide variety of shapes. Further, secondary spring 48 could be fastened to lower spring pocket 44 through aperture 60' and function with equal efficiency as when attached to upper spring pocket 42 through aperture 60.

The foregoing discussion discloses and describes a preferred embodiment of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. A suspension mounting structure used on a vehicle, said suspension mounting structure comprising:
   a one-piece cast member having a generally circular, radially contoured, disk portion serving as a spring pocket, said disk portion having a first side and a second side, said first side engaging one or more suspension spring members, said disk portion having a lid turned toward said suspension spring members at a radially outer edge, and a frusto-conical section turned toward said suspension spring members, said frusto-conical section extending a greater distance toward said spring members than said lip; and
   a plurality of substantially perpendicular flanges extending from said second side, said flanges being generally parallel to and spaced from one another.

2. The suspension mounting structure of claim 1 wherein said flanges include a first flange and a second flange, said first flange extending from a first edge of said disk portion to a second edge of said disk portion in a linear fashion, said second flange extending from a first edge of said disk portion to a second edge of said disk portion and intersecting said frusto-conical section, said second flange arcuately conforming to and bowing with said frusto-conical section.

3. The suspension mounting structure of claim 2 wherein said first flange and said second flange are spaced a distance to allow a frame rail of the vehicle to be mounted between said first and second flanges, said first and second flanges being fixedly secured to said frame rail.

4. The suspension mounting structure of claim 2 wherein said first flange and said second flange are configured to provide a fastening surface coordinated to align with a corresponding surface on an axle assembly of the vehicle, said first and said second flanges being fixedly secured to said axle assembly.

5. The suspension mounting structure of claim 1 wherein said frusto-conical section has an aperture coaxial with said frusto-conical section.

6. A suspension spring mounting assembly used on a vehicle having a frame rail and an axle housing, the spring mounting assembly comprising:
   a one-piece cast upper spring pocket fixedly secured to said frame rail, said upper spring pocket including a generally circular, radially contoured, disk portion serving as a spring pocket, said disk portion having a down turned lip at a radially outer edge and a down turned frusto-conical section, said upper spring pocket further including an upwardly extending first flange and an upwardly extending second flange, said first flange and said second flange being generally perpendicular to said disk portion, and generally parallel to and spaced from one another wherein said first flange extends from a first edge of said disk portion to a second edge of said disk portion in a generally linear fashion, and said second flange extends from a first edge of said disk portion to a second edge of said disk portion, intersecting said frusto-conical section;

a lower spring pocket fixedly secured to said axle housing;

spring means for supporting said vehicle, said spring means having a first end in operative relation to said upper spring pocket, and a second end in operative relation to said lower spring pocket.

7. The spring mounting assembly of claim 6 wherein said first flange and said second flange are spaced a distance to allow said frame rail to be mounted between said first and second flanges, said first and second flanges being fixedly secured to said frame rail.

8. The spring mounting assembly of claim 6 wherein said lower spring pocket includes a one-piece cast member having a generally circular, radially contoured, disk portion serving as a spring pocket, said disk portion having an up turned lip at a radially outer edge and an up turned frusto-conical section, said lower spring pocket further including a downwardly extending first flange and a downwardly extending second flange, said first flange and said second flange being generally perpendicular to said disk portion, and generally parallel to and spaced from one another wherein said first flange extends from a first edge of said disk portion to a second edge of said disk portion in a generally linear fashion, and said second flange extends from a first edge of said disk portion to a second edge of said disk portion intersecting said frusto-conical section.

9. The spring mounting assembly of claim 8 wherein said first flange and said second flange of said lower spring pocket are configured to provide a fastening surface coordinated to align with a corresponding surface on said axle housing, said first and said second flanges of said lower spring pocket being fixedly secured to said axle housing.

10. A method for making and assembling a vehicle suspension system, said method comprising:

casting a one-piece spring pocket having a disk portion and a first flange and a second flange, said disk portion having a lip at a radially outer edge turned toward a spring, and a frusto-conical section projecting toward said spring, said first flange and said second flange being substantially perpendicular to said disk portion and generally parallel to and spaced from one another, wherein said first flange extends from a first edge of said disk portion to a second edge of said disk portion in a generally linear fashion, said second flange extends from a first edge of said disk portion to a second edge of said disk portion and intersects said frusto-conical section;

fastening the flanges of the spring pocket to a member on the vehicle; and mounting an end portion of the spring to the disk portion of the spring pocket.

11. The method of claim 10 further comprising:

attaching said spring pocket to the vehicle member such that the flanges lie on opposite sides of the member.

12. The method of claim 10 wherein said vehicle member is a frame rail, and wherein the method comprises:

spacing the first and second flanges apart from each other to allow the frame rail to be mounted between the first and second flanges.

13. The method of claim 10 wherein the vehicle member is an axle assembly, and wherein the method comprises:

configuring the first and second flanges to provide fastening surfaces conforming with the axle assembly; and affixing the fastening surfaces of the first and second flanges onto the axle assembly.

14. A suspension mounting structure used on a vehicle, said suspension mounting structure comprising:

a one-piece cast member having a generally circular, radially contoured, disk portion serving as a spring pocket, said disk portion having a first side and a second side, said first side engaging a suspension spring member, said disk portion having a lip turned toward said spring member at a radially outer edge and a frusto-conical section turned towards said spring member; and a first flange and a second flange extending from said second side, said first and second flanges being substantially perpendicular to said second side and being generally parallel to and spaced from one another wherein said first flange extends from a first edge of said disk portion to a second edge of said disk portion in a generally linear fashion and said second flange extends from a first edge of said disk portion to a second edge of said disk portion and intersects said frusto-conical section.

15. The suspension mounting structure of claim 14 wherein said first flange and said second flange are spaced a distance to allow a frame rail of the vehicle to be mounted between said first and second flanges, said first and second flanges being fixedly secured to said frame rail.

16. The suspension mounting structure of claim 14 wherein said first flange and said second flange are configured to provide a fastening surface coordinated to align with a corresponding surface on an axle assembly of the vehicle, said first and said second flanges being fixedly secured to said axle assembly.

\* \* \* \* \*